April 19, 1949.     G. EHRENBERG     2,467,733
DEVICE FOR DETERMINING DEPARTURES FROM
LEVEL OF MACHINE ELEMENTS
Filed Dec. 6, 1944

WITNESS:
INVENTOR
Gustave Ehrenberg
BY
Busser and Harding
ATTORNEYS.

Patented Apr. 19, 1949

2,467,733

UNITED STATES PATENT OFFICE 2,467,733

DEVICE FOR DETERMINING DEPARTURES
FROM LEVEL OF A MACHINE ELEMENT

Gustave Ehrenberg, Philadelphia, Pa.

Application December 6, 1944, Serial No. 566,893

5 Claims. (Cl. 33—74)

In the operation of many machines it is essential that the machine be so set up that a major horizontally extending element thereof shall be level to within a small fraction of a millimeter; that is: the elevation of differently located points on the upper surface of such machine element, whether such element have a flat upper surface, or whether it is a shaft, shaft bearing or cylinder, or whether it be an element having some other contour, must be substantially identical. When such a machine is set up the eye cannot be depended upon to level it; ordinary level indicators are usually not dependable to locate slight departures from a precise level; and other means for locating such departures usually involve the operation of devices of some complexity and require the exercise of skill and considerable time.

The object of my invention is to provide a level indicator that is simple in construction, that requires for its operation merely care, as distinguished from skill, that will enable differences in level to be located in a minimum of time and that will determine with extreme accuracy the slightest differences in level.

These objects are accomplished by my invention, one preferred embodiment of which is shown in the accompanying drawings, in which—

Mounted on a base $a$ is a frame $b$ having at its upper end a neck $c$, within which is slidable a bar $d$, from which depends a stem $e$. The bar has a pin and groove engagement, $t$—$u$, with the neck $c$ so that it can freely slide, but not turn, therein. To the stem $e$ is secured an internally threaded tubular member $f$ surrounding and in threaded engagement with an externally threaded member $g$ having an enlarged lower end to which is secured a sleeve $h$ surrounding and turnable on the tubular member, forming an ordinary micrometer.

Depending from the enlarged lower end of the member $g$ is a pin $h'$. Freely slidable in the base $a$ is a rod $i$, in axial alignment with the pin $h'$ and having at its upper end a disc $j$, upon which the pin $h'$ rests.

Mounted on the upper end of the bar $d$ is a rod $k$, to which is secured a sight disc $m$ having two sets of cross-marks $n$, each set consisting of two lines perpendicular to one another, and at 45° to the vertical and horizontal. One set is heavy for distant work; one set fine for close work.

The member $f$ is secured to the stem $e$ by a set screw $o$. The rod $k$ is secured to the bar $d$ by a set screw $p$. The sight disc $m$ is secured to the rod $k$ by means of the set screw $r$.

The various elements of the structure that are united by set screws may thus be readily disassembled and reassembled. The elements $f$, $g$ and $h$ may thus be inserted between the two posts of the frame $b$, while the bar $d$ is insertable downward within the neck $c$ of the frame $b$ and then secured to the tubular member $f$. Any number of rods $k$, $k'$ of different length may be provided in order to raise the sight disc to any convenient height.

When the device is placed upon the machine to be leveled, the disc $j$ of the rod $i$ engages the pin $h'$ and lifts the entire device, except the base $a$ and frame $b$, to a precise definite distance above the surface engaged by the rod $i$.

Figure 1:
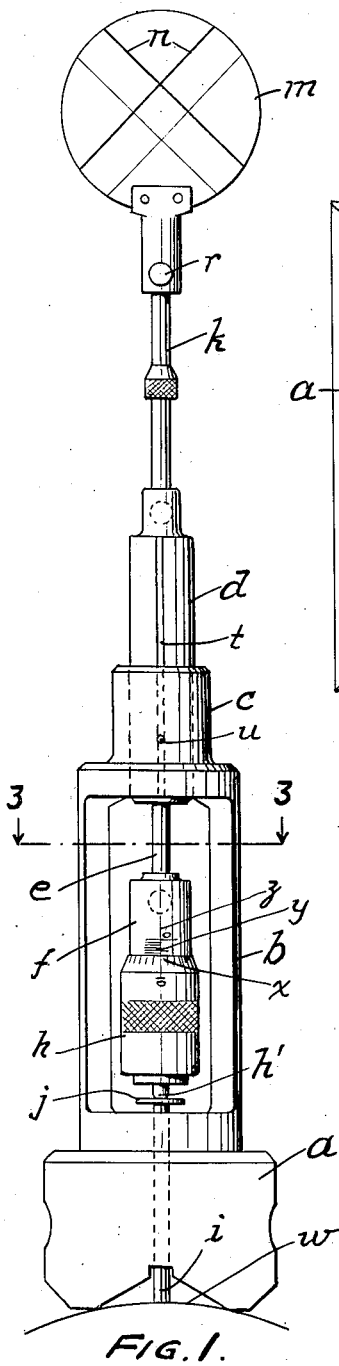
Figs. 1 and 2 are elevational views taken at angles of 90° one from the other.
Figure 3:
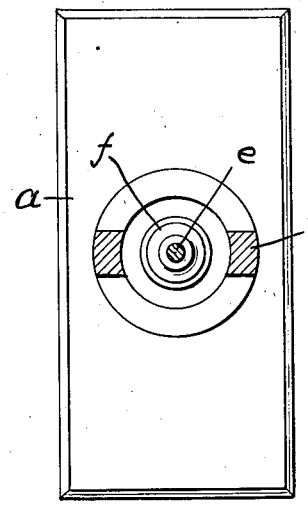
Fig. 3 is a section on the line 3—3 of Fig. 1.
Figures 2, 4:
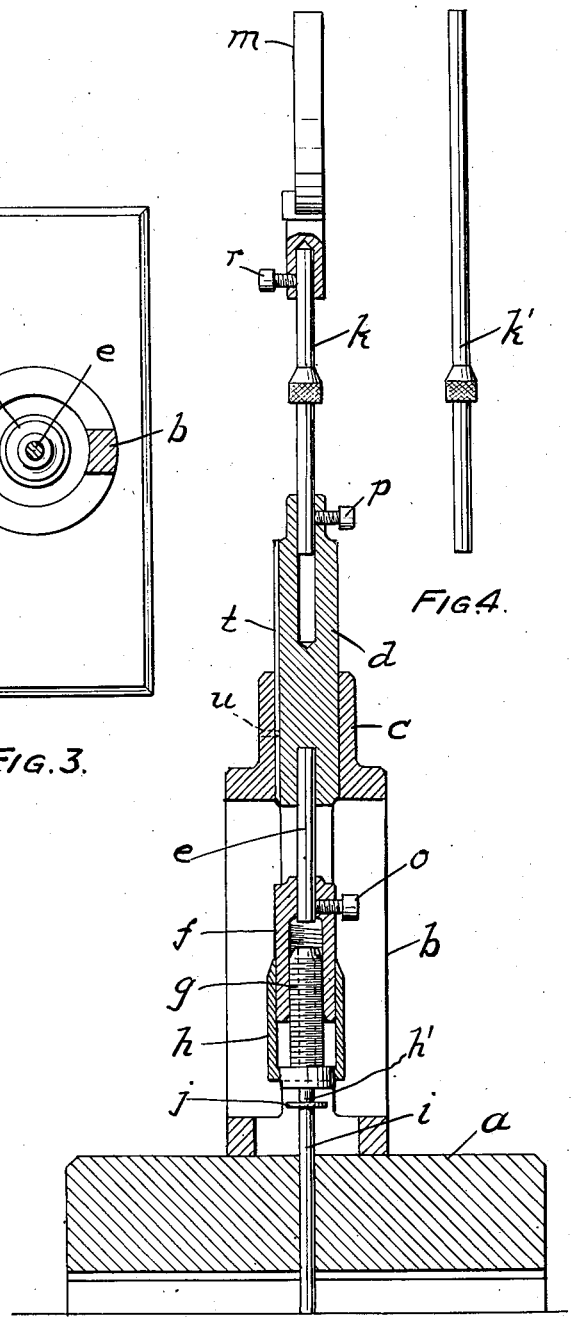
Fig. 4 is a detail view of one of several elements that may be substituted for one of the elements shown in Figs. 1 and 2.

It will be observed that the base $a$ is so undercut that the device may rest upon a plane surface or a curved surface, so that the rod $i$ will lift the device a definite distance above the level of a plane surface, or of the trough of a concavely curved surface, or of the crest of a convexly curved surface as indicated at $w$, Fig. 1.

In operating the device it is placed, successively, on two widely separated points on the upper surface of the machine to be leveled.

From the two points on which the device is to be placed are inscribed two imaginary circles, at the intersection of which is located a surveyor's level with a telescope equipped with vertical and horizontal cross-hairs. The telescope is leveled and its elevation adjusted so that the target comes within its field of view. A vertical adjustment of the target is then made by means of the micrometer until the horizontal cross-hair of the telescope accurately bisects the angle between the cross-marks on the sight disc $m$. With the target in this position a reading of the micrometer is taken using its scales $x$ and $y$.

The device is then placed at position No. 2. If the horizontal cross-hair of the telescope again bisects the angle between the cross-marks of the sight disc $m$ as at position No. 1 the machine is precisely level. However, this is seldom or never the case when the machine is first set up. The sleeve $h$ is turned so as to raise or lower the sight glass $m$ until the horizontal cross-hair of the telescope again bisects the angle between the cross-marks on the sight disc $m$ as at position No. 1. A reading of the two scales $x$ and $y$ will then determine the difference in the two levels. The horizontal lines on scale $y$ may be spaced apart (say) one-fortieth of an inch, while the finer scale $x$ may have (say) twenty-five marks around its circumference. One turn of the sleeve $h$ lifts or lowers the tube $f$ a distance equal to the space between two adjacent horizontal lines on scale $y$. By comparing the scale readings at the two different positions of the device, the difference in level may be readily computed to the one-thousandths of an inch.

It will therefore be understood that, after determining the difference in level between two spaced apart surfaces of a machine, the machine may be moved toward a leveled position by lifting or lowering one end thereof. The described operation of the device may be then repeated—several times if necessary—until the compared scale readings of the device in the two different positions precisely correspond.

The device may be used for checking alignment of shafts and bearings. When used for this purpose a bubble level is placed on the base of the target to insure that the bar $d$ is accurately vertical. With the target at one position on a shaft, a surveyor's transit mounted on the same shaft is so oriented that its vertical cross-hair accurately bisects the vertical angles between the cross-marks on the sight disc $m$. The target is then moved to a second position on the shaft, and any error in alignment is detected by a deviation of the vertical cross-hair from the intersection of the cross-marks on the sight disc $m$.

What I claim and desire to protect by Letters Patent is:

1. A level indicator comprising a frame adapted to rest upon the machine surface to be levelled, a non-rotatable element vertically slidable in the frame, a sight disc carried by said element, a second element in threaded engagement with the first element and turnable thereon, said elements being provided with registering scales, and a third element vertically slidable in the frame below the second element and adapted, when the frame is placed on the machine surface, to contact therewith and upon which the turnable element is adapted to rest.

2. A level indicator comprising a frame adapted to rest upon the machine surface to be levelled, a non-rotatable element vertically slidable in the frame, a sight disc carried by said element, said element having, at its lower end, a tubular member, a second turnable element comprising a sleeve on the tubular member and a member extending into said tubular member and in threaded engagement therewith, said sleeve and tubular member having registering scales, and a third member vertically slidable in the frame below the second member and adapted to contact with said surface and upon which said turnable element is adapted to rest.

3. A level indicator as defined in claim 2 wherein the vertically slidable element comprises a bar slidable in the frame, a rod above and detachably secured to the bar and to which the sight disc is detachably secured and a stem depending from said bar to which the said tubular member is detachably secured.

4. A level indicator as defined in claim 1 in which the frame comprises a base which is undercut in a longitudinal direction and in which said third element extends through the base and into the transverse center of said undercut to enable the movable elements to be positioned definite distances above machine surfaces of different contours.

5. A level indicator as defined in claim 1 in which the frame comprises a base which is undercut in a longitudinal direction and in which said third element comprises a rod extending through the base into said undercut and a disc on the upper end of the rod, the lower end of the rod contacting with the surface of the machine when the frame is placed thereon and lifting the turnable element, the first named element and the sight disc to a definite distance, at any given adjustment of the registering scales, above the machine surface.

GUSTAVE EHRENBERG.

REFERENCES CITED

The following references are of record in the file of this patent:

UNITED STATES PATENTS

| Number | Name | Date |
|---|---|---|
| 2,169,533 | Kasten | Aug. 15, 1939 |